Nov. 8, 1938.   W. A. SMITH   2,135,629
METHOD FOR MAKING FRUIT PRODUCTS
Filed June 23, 1937   2 Sheets-Sheet 1
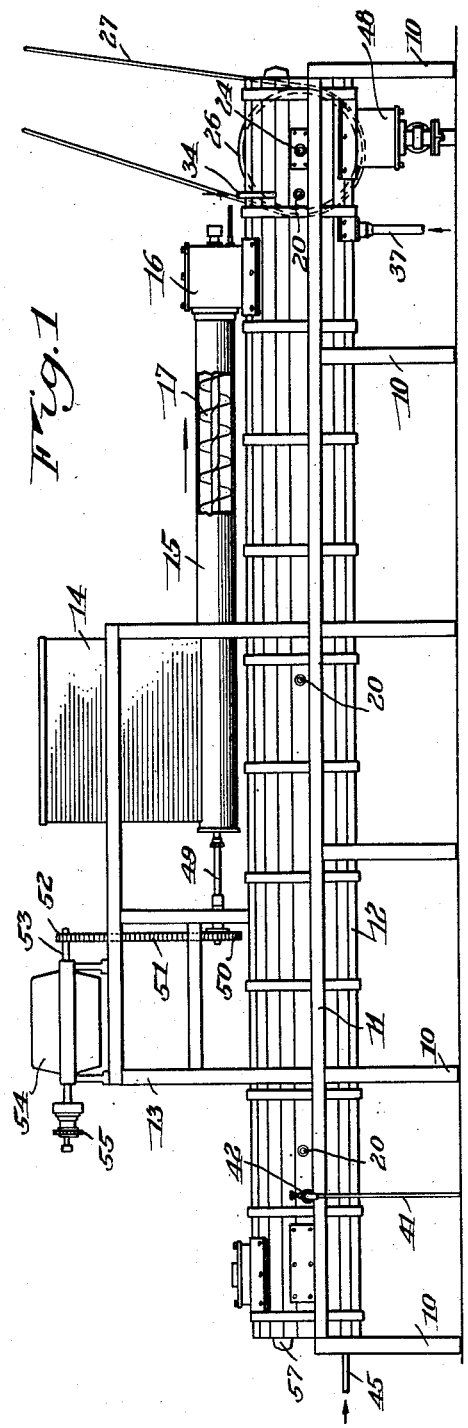
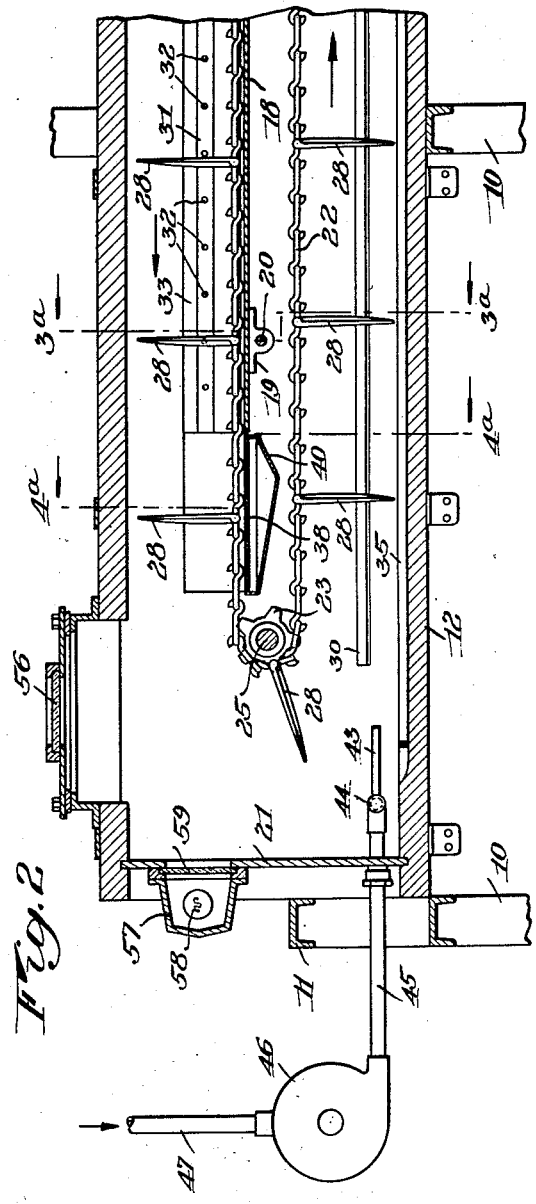
INVENTOR.
William A. Smith
BY Cumpston & Shepard
his ATTORNEYS Nov. 8, 1938. W. A. SMITH 2,135,629
METHOD FOR MAKING FRUIT PRODUCTS
Filed June 23, 1937 2 Sheets-Sheet 2
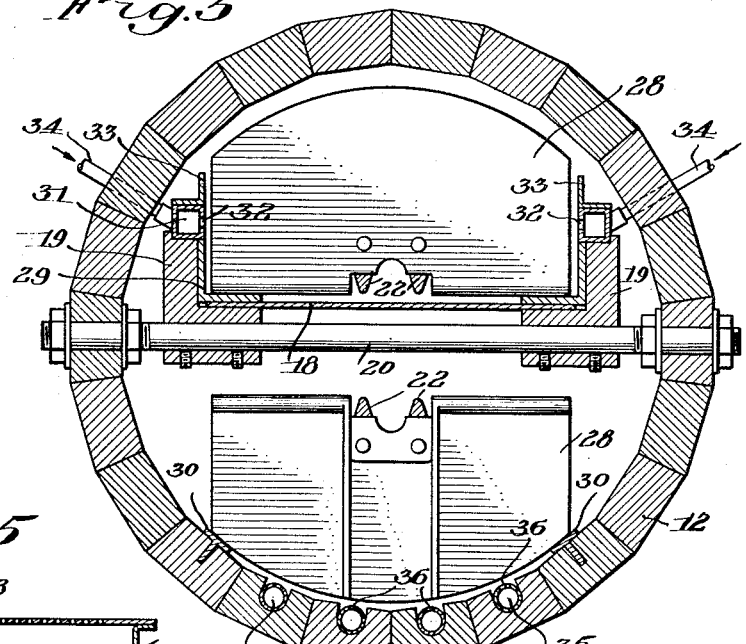
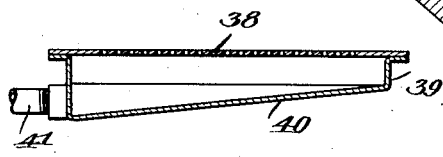
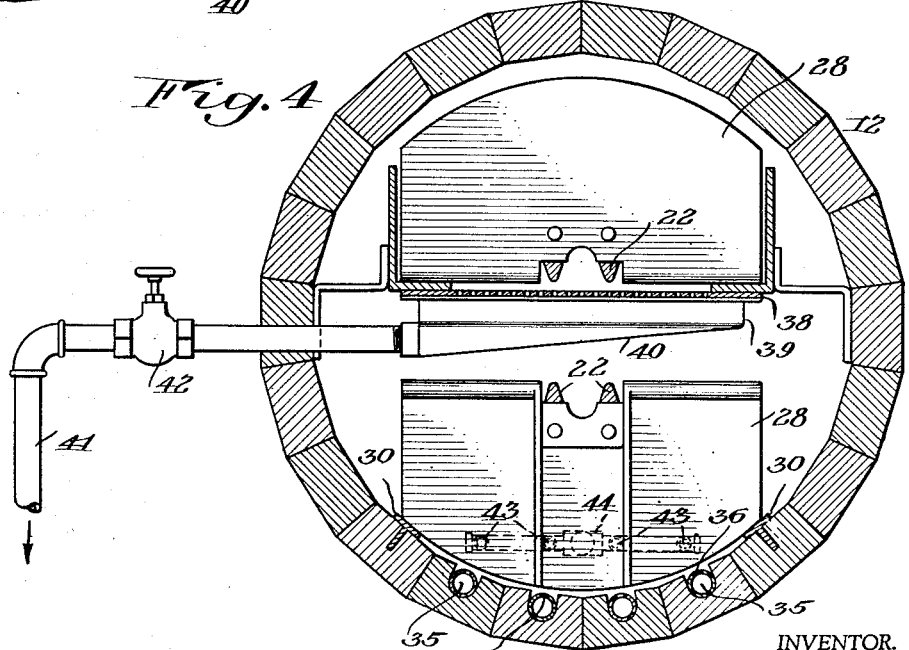
INVENTOR.
William A. Smith
BY Cumpston & Shepard
his ATTORNEYS Patented Nov. 8, 1938

2,135,629

UNITED STATES PATENT OFFICE 2,135,629

METHOD FOR MAKING FRUIT PRODUCTS

William A. Smith, Lyndonville, N. Y.

Application June 23, 1937, Serial No. 149,933

6 Claims. (Cl. 99—101)

This invention relates to methods for making cooked fruit products such, for example, as apple or other fruit sauces, and to apparatus for carrying out the same, an object of the invention being to provide such a method and apparatus of a more simple and economical character and for making a product of improved quality.

A further object is to provide a more convenient and inexpensive method for manufacturing such products with the use of syrup instead of dry sugar as a sweetening means, as well as an efficient apparatus for carrying out such method. More particularly, the invention has as an object the improvement of the method of making fruit sauces in which the fruit is moved continuously through a regulated flow of steam to progressively moisten and cook it, by adapting such method for use with syrup as a sweetening means for the fruit, thereby eliminating certain difficulties hereinafter referred to in the use of dry sugar, and also reducing the cost of the product.

To these and other ends the invention resides in certain improvements and combinations of parts, all as will be hereinafter more fully described, the novel features being pointed out in the claims at the end of the specification.

In the drawings:

Fig. 1 is a side elevation of an apparatus for carrying out the present invention;

Fig. 2 is an enlarged vertical section of a portion of said apparatus;

Fig. 3 is an enlarged sectional view on the line 3a—3a in Fig. 2;

Fig. 4 is an enlarged section on the line 4a—4a in Fig. 2, and

Fig. 5 is a sectional view of a moisture collecting means shown in Fig. 4.

The same reference numerals throughout the several views indicate the same parts.

My prior patents, Nos. 1,523,843, 1,627,466 and Re. 17,308, disclose a continuous method of making fruit or apple sauce in which the fruit cuttings are moved progressively through a flow of free steam which is controlled to moisten and cook the fruit to the degree desired for producing the best quality of product. It has been found, however, in the use of such method that different varieties of fruit contain varying amounts of juices and require different degrees of cooking and that it is often inconvenient to obtain cooking steam of the desired temperature and pressure, with the result that the application of the quantity of steam required for cooking may introduce an amount of moisture which, when added to the water content of the fruit, tends at times to produce an excess watering and thinning of the final product. This prior method also involved the use of dry sugar as a sweetening means, preferably although not necessarily mixed with the fruit prior to steaming. The continuous feeding and mixing of dry sugar with the fruit at a predetermined rate, particularly in a moist or steamy atmosphere, introduces certain difficulties, as well understood in the art, requiring particular mechanism for satisfactory operation, and dry sugar is a relatively expensive ingredient. I have found that a sugar syrup is much less expensive and may be supplied or pumped through a pipe and mixed with the fruit cuttings with simpler mechanism and more convenience than in the use of dry sugar. Any known or suitable sweetening syrup may be employed, as will be obvious to those skilled in the art.

However, the use of syrup for this purpose, added before, during, or after the cooking, was found to present a further problem. To produce the best product it is desirable to regulate the temperature and pressure of the steam to effect the desired degree of moistening and cooking of the fruit, and the addition of syrup and its moisture content tended to produce excessive moisture in and thinning of the product, particularly under the varying conditions as to the water content of the fruit and the like referred to above. I have found that these problems may be solved by withdrawing a portion of the moisture in the fruit at a preliminary stage of the cooking treatment and then continuing the cooking treatment as required, thus compensating also for the moisture content added by the syrup.

In the cooking of the fruit, a substantial amount of heat is required to initially raise the temperature of the cold fruit to that at which cooking takes place. This heat is added by application of a substantial amount of steam which condenses mainly in the form of water before the fruit is sufficiently heated and cooked to release its juices. It has been found that after this preliminary heating, a portion of the moisture so added may be drained off and removed without substantial loss of actual fruit juices. This is preferably accomplished by subjecting the fruit, after such preliminary heating, to a draining treatment as by moving it over a reticulated surface or strainer and discharging the excess moisture so removed. In this way, more or less of the water content may be removed and the consistency or thickness of the finished product accurately controlled as conditions may require.

After thus reducing the moisture content of the fruit, moreover, a syrup may be added, either immediately and the cooking continued, or the cooking may be continued and the syrup added afterwards and mixed in during the final screening or pulping step by which the cooked fruit is broken up and reduced to a substantially homogeneous consistency.

Preferably the syrup is supplied to the fruit immediately after the removal of the excess moisture, as by discharging it in a relatively fine spray into the fruit as it is moved along during the subsequent heating and cooking treatment. Preferably this subsequent heating and cooking is accomplished as before by moving the fruit through impinging jets of steam by which it is further moistened and cooked, but such further steaming may be supplemented or replaced in whole or in part by the supply of heat by means of a heating jacket on the container, as well understood in the art.

My above method may be carried out by means of the apparatus disclosed in my said patents by providing the cooking container with the said means for draining off excess moisture, omitting the devices for feeding the dry sugar and providing means for subsequently adding the sugar or syrup. However, it is preferable to employ instead the apparatus disclosed in my Patent No. 2,081,512, issued May 25, 1937, for Apparatus for preparing food substances, modified to accomplish the present method. The drawings illustrate and I will now describe such an apparatus.

Mounted on standards 10 and a frame 11 of suitable construction is an elongated cooking container or drum 12, preferably of the generally cylindrical shape shown. On an upward extension 13 of the frame is a hopper 14 for the fruit cuttings communicating at its bottom with a cylindrical trough 15 extending rearwardly above and parallel with the cooking drum 12. The rear end of the trough 15 communicates with a casing 16 mounted on and discharging through an opening in the top of the drum. Within the trough 15 is a worm 17 extending at its forward end under the discharge from hopper 14 to advance the fruit through the trough into the casing 16 at its rear end and the casing may contain suitable valve means (not shown) to be opened by the advancing fruit, but to be closed by a spring or the pressure of the steam in the cooking drum when the flow of fruit ceases, as disclosed, for example, in my said Patent No. 2,081,512, but forming no part of the present invention.

Within the drum 12 and substantially midway of its height is a table 18 supported on brackets 19 on transverse rods 20 mounted at their ends in the sides of the drum. Table 18 extends at its rear end under the opening from casing 16 through which the fruit is supplied to the drum, and its forward end extends to a point adjacent but spaced from the forward end 21 of the drum. As the apple cuttings are supplied through trough 15 and casing 16 to the cooking drum, they fall on the rear end of table 18, and means is provided for progressively advancing the fruit to the opposite or forward end of the table where it is discharged to the bottom of the drum and then moved rearwardly by the feeding means to the point of discharge at the rear end of the bottom of the drum.

The means for advancing or feeding the fruit through the cooking drum comprises preferably a continuous sprocket chain 22 running at its ends over similar sprocket wheels, one of which is shown at 23 (Fig. 2). The sprocket wheels are fixed on transverse shafts 24 and 25 rotating at their ends in bearings on the sides of the drum. Shaft 24 at the rear end of the machine carries a pulley 26 driven by a belt 27 from any suitable source of power. Fixed on the chain are spaced blades 28 which move the fruit first forwardly along table 18, over its forward end to the bottom of the drum, and then rearwardly along the latter to the discharge outlet. Table 18 and brackets 19 preferably carry superposed angle bars 29 on which the inner edges of blades 28 rest and are guided in their movement so that their bottom edges sweep along close to the table 18. As the blades pass around sprocket 23 and move rearwardly along the bottom of the drum their outer edges slide along and are supported by T bars 30 in the drum wall, so that the blades sweep near but without scraping the drum.

The means for heating and cooking the fruit preferably comprises a series of steam conduits or pipes provided with openings for directing jets of steam directly into contact with the fruit, as it is progressively advanced through the cooking drum. Such steam pipes are provided above and adjacent the table 18, in the present instance in the form of the rectangular conduit 31 having the jet openings 32 for injecting currents of steam into the fruit as it is moved along the table. Supported on such pipes are angle bars 33 for increasing the depth of the channel formed by the table and its sides. The steam is supplied to the pipes 31 through the supply lines 34.

The fruit is additionally heated and cooked as it is moved rearwardly along the bottom of the drum, preferably by the continued injection of steam. For this purpose the inner surface of the bottom of the drum has embedded therein a series of parallel pipes 35 extending longitudinally of the drum as shown and having perforations 36 for directing jets of steam into the fruit as it is moved along the bottom of the drum. Pipes 35 are supplied through a steam line 37.

The means for withdrawing excess moisture from the fruit during the heating process is preferably located at the forward end of the table 18. As the fruit cuttings are discharged upon and moved along the table, they are subjected to preliminary heating by the steam from the jets 32 to bring them up to cooking temperature. Such steam is condensed by the relatively cold fruit as it is progressively brought up to cooking temperature, but at the forward end of the table 18 the fruit cuttings are not sufficiently cooked to give off any substantial amount of juices and the liquor at that point is mainly the condensate from the heating steam. The means for removing excess moisture, therefore, may be conveniently located at this point and comprises, in the present instance, a collector in the form of a perforated plate 38 (Figs. 2, 4, and 5) arranged as an extension of the table 18. Beneath the drainage plate 38 is a trap or box 39 having an inclined bottom 40 discharging into an outlet pipe 41 controlled by a valve 42 which may be adjusted to maintain a level of water in the trap 39 to prevent the escape of steam. By this means, as the fruit cuttings are fed over plate 38, the excess moisture drains off through the openings in the plate and is removed without interruption of the process and the amount of moisture so removed may be controlled by means of the discharge valve 42. The fruit is then discharged downwardly over the forward end of plate 38 and falls, as stated, to the bottom of the front end of the cooking drum for continued heating and cooking as it is moved rearwardly along the drum.

The means for supplying syrup for sweetening the product preferably comprises one or more relatively small pipes 42, 43 projecting rearwardly toward the fruit from a manifold 44 in the forward end of the drum. The manifold is supplied, in turn, through a pipe 45 from a pump 46 of any suitable type connected to a syrup container. The supply line may be controlled by suitable valve means (not shown), as well as by the speed of the pump 46, to inject the syrup at a rate proportional to the rate of feed of the fruit cuttings and in accordance with the degree of sweetening required. The fruit and syrup are moved rearwardly along the bottom of the drum through the jets of steam described above and are gently stirred and mixed by the feeding movement, as well as by the force of the impinging jets of steam. The syrup is thus mixed with the hot fruit in a suitable state of moisture and the mixture is thoroughly cooked by the time it reaches the rear end of the drum. At that point it falls through a discharge opening into a casing 48 from which it passes through suitable piping to the pulper or other equipment by which it is broken up, screened and fed in a homogeneous state to the cans, as well understood in the art.

It will be apparent, however, that after the excess moisture has been removed by the collecting means described, either dry sugar may be introduced by feeding means such as described in my prior patents, or syrup may be introduced and mixed with the fruit, at any desired point in the subsequent cooking, or even after the product is cooked. By such means the moisture content of the product may be controlled in accordance with varying conditions so as to prevent excess moisture and the thinning of the product, notwithstanding the use of a sweetening syrup.

The worm 17 for feeding the fruit from the hopper 14 to the cooking drum may be driven in any suitable manner as by extending its shaft 49 forwardly and providing it with a sprocket wheel 50 driven by a chain 51 from a sprocket 52 on the shaft 53 of a change speed gearing indicated generally at 54 and driven by any suitable means connected with the sprocket 55. The cooking drum may be provided with various convenient accessories, such as an inspection window 56 and a housing 57 for a lamp 58, by means of which the interior may be lighted through a window 59, as more fully described in my said Patent No. 2,081,512, but forming no part of the present invention.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The method of making a cooked fruit product comprising subjecting the fruit to a preliminary heating by contact with steam, removing a portion of the condensed steam prior to release of the fruit juices, and subsequently continuing and completing the heating and cooking of the fruit to produce a cooked product of suitable moisture content.

2. The method of making a cooked fruit product comprising preliminary heating of the fruit by subjecting the same to contact with jets of steam, removing a portion of the moisture content prior to release of the fruit juices, and subsequently continuing the subjection of the fruit to contact with jets of steam to complete the heating and cooking of the same to produce a product of suitable moisture content.

3. The method of making a cooked fruit product comprising heating the fruit by contact with steam, removing the excess moisture, adding syrup in sufficient quantity to afford the desired sweetening, and mixing said fruit and syrup ingredients to form the sweetened product.

4. The method of making a cooked fruit product comprising subjecting the fruit to a preliminary heating by contact with steam, removing a portion of the moisture content, continuing the application of heat to cook the fruit, adding syrup after said removal of moisture in sufficient quantity to afford the desired sweetening, and mixing said fruit and syrup ingredients to form the desired product.

5. The method of making a cooked fruit product comprising subjecting the fruit to a preliminary heating by contact with steam, removing a portion of the moisture content, continuing the contact with steam to cook the fruit, adding syrup after said removal of moisture, and mixing said fruit and syrup ingredients to form the desired sauce.

6. The method of making a cooked fruit product comprising subjecting the fruit to a preliminary heating by contact with steam, removing a portion of the moisture content, and mixing syrup with the fruit in sufficient quantity to afford the desired sweetening and continuing the application of heat until the product is cooked.

WILLIAM A. SMITH.